A. K. EHLERS.

Saw-Mills.

No. 6,185. Reissued Dec. 22, 1874.

Witness:
Chas. Thurman
D. Dyer

Inventor:
Augustus R. Ehlers,
by Geo. W. Dyer & Co
Attys

THE GRAPHIC CO. PHOTO-LITH. 39 & 41 PARK PLACE, N.Y.

UNITED STATES PATENT OFFICE.

AUGUSTUS R. EHLERS, OF TANNERSVILLE, PENNSYLVANIA, ASSIGNOR TO JAMES B. WAYNE, OF DETROIT, MICHIGAN.

IMPROVEMENT IN SAW-MILLS.

Specification forming part of Letters Patent No. 78,443, dated June 2, 1868; reissue No. 6,185, dated December 22, 1874; application filed July 24, 1874.

*To all whom it may concern:*

Be it known that I, AUGUSTUS R. EHLERS, of Tannersville, in the county of Monroe and State of Pennsylvania, have invented a new and useful Improvement in Saw-Mills; and I do hereby declare that the following is a full, clear, and exact description thereof, which will enable others skilled in the art to make and use the same, reference being had to the accompanying drawings, forming part of this specification.

Figure 2:
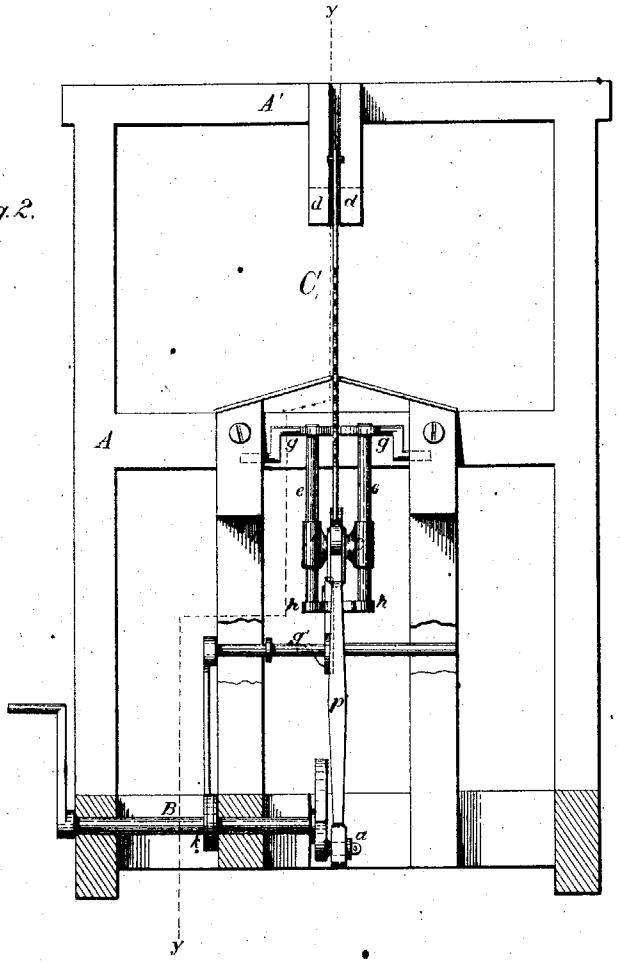
Figure 1:
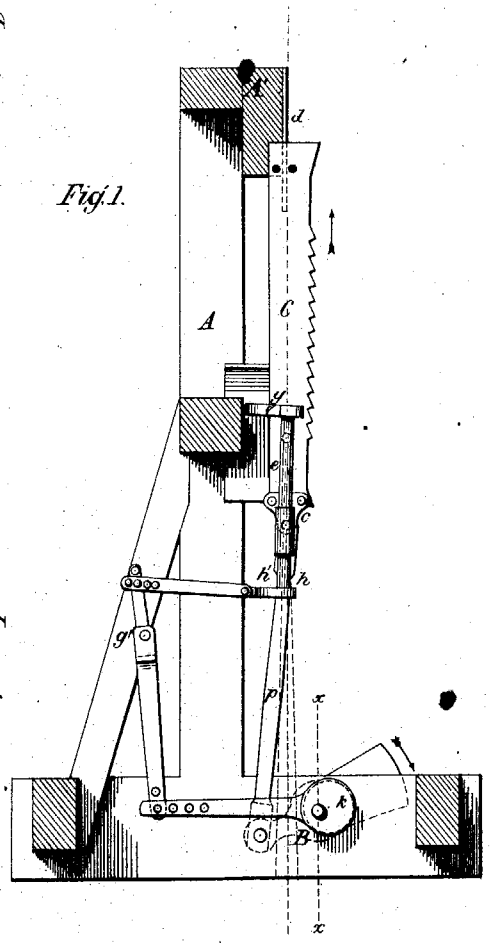

Figure 1 is the vertical section through the framing of the mill, presenting a side view of the saw and its driving machinery. Fig. 2 is a front or edge view of the saw and its driving machinery.

Similar letters of reference indicate corresponding parts.

This invention relates to an improvement in the construction of machinery for driving a straight saw for sawing lumber; and consists in the combination of pivoted slides, an eccentric on the main shaft, and connections between the lower end of the saw and the main shaft, as more fully hereinafter described.

A represents the framing for supporting the saw and machinery of a mill. B is a driving-shaft, having a crank, *a*, connected by the pitman *p* with an oscillating slide, *c*, to which the saw C is attached at the lower end, while its upper end is held between the edges of two guide-plates, *d d*, secured to the cross-beam A′.

The oscillating slide *c* works upon oscillating guide-rods or slides *e e*, the upper ends of which are fastened to a rock-shaft or pivot, *g*, and the lower ends to the forks *h h* of a yoke, *h′*, connected with a rock-shaft, *g′*, which receives its motion from an eccentric, *k*, on a driving-shaft, B.

It will be seen that, by this arrangement of machinery in connection with the saw, the lower end will be drawn back from the log to a maximum degree at the end of its downstroke, when the crank *a* is on its lower center, and thus the saw will allow the log to be moved up at that moment, and on its upstroke will rise clear of the kerf to the highest point, from which it will again advance in making the downstroke by a regular movement, thus striking the log gently at first, and increasing the bite to the end of the stroke, instead of striking the log with a full bite at the top of the stroke, in the usual way.

It will be also seen that, by means of the adjustability of the connections between the saw-frame and the eccentric, the extent of the oscillation of the same frame may be changed as desired.

It will also be seen that, by changing the position of the eccentric upon the main shaft, the path of the lower end of the saw can be changed as desired.

The advantages of this arrangement are important in sawing lumber rapidly and preserving the saw-teeth from wear, as before stated.

There is also an additional advantage arising from my improvement, which, by taking the pull upon the guide-rods or slides, instead of the saw, enables me to use thinner saws than I could otherwise do.

Having thus described my invention, what I claim as new, and desire to secure by Letters Patent, is—

In a saw-mill, the combination of pivoted slides, an eccentric on the main shaft, and connections between the lower end of the saw and the main shaft, substantially as shown.

AUGUSTUS R. EHLERS.

Witnesses:

L. T. SMITH,

F. E. RÜEHLMANN.